No. 647,678. Patented Apr. 17, 1900.
C. W. MERRILL.
MEANS FOR CHARGING LEACHING VATS.
(Application filed Feb. 7, 1900.)
(No Model.)
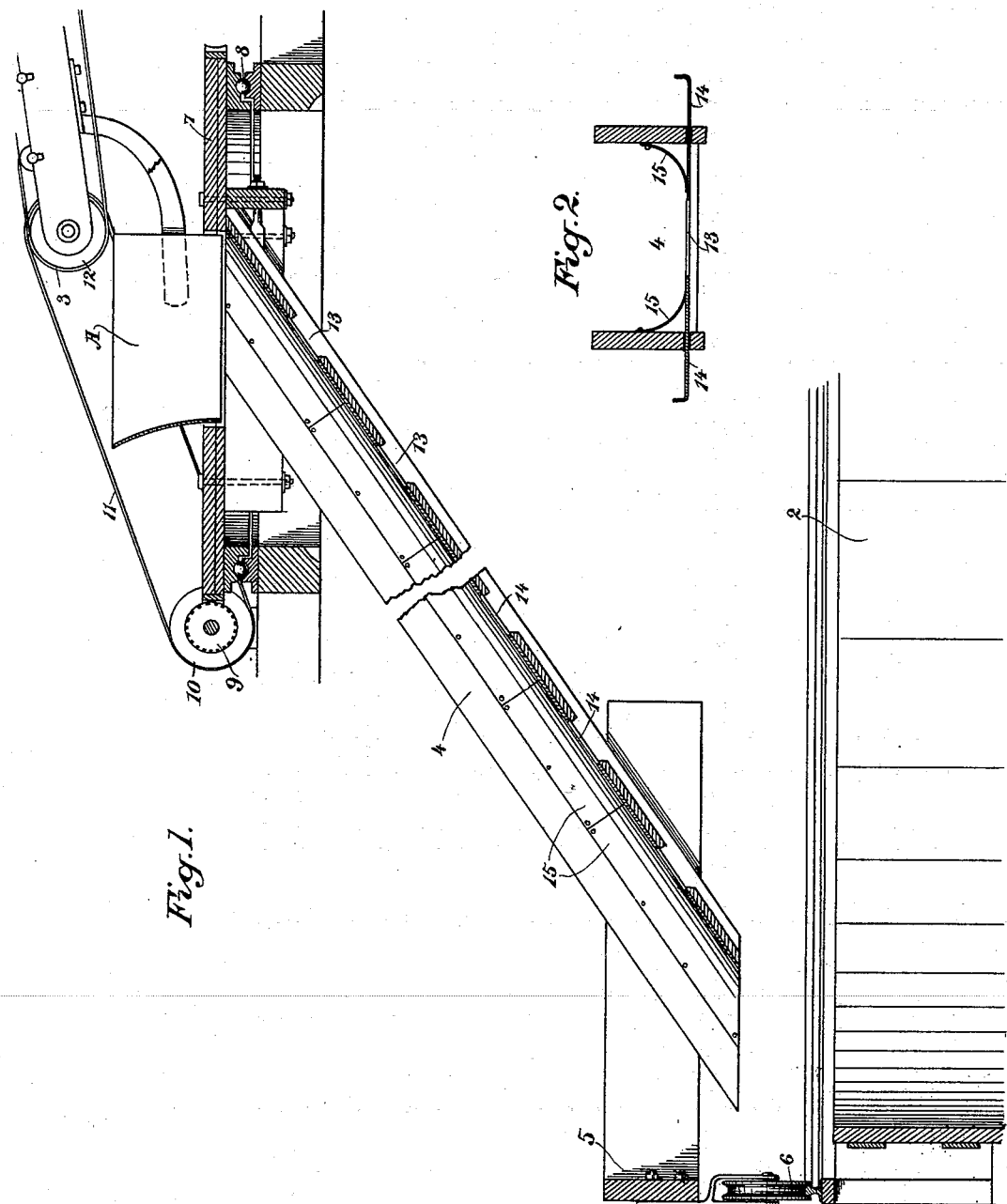

UNITED STATES PATENT OFFICE.

CHARLES W. MERRILL, OF ALAMEDA, CALIFORNIA.

MEANS FOR CHARGING LEACHING-VATS.

SPECIFICATION forming part of Letters Patent No. 647,678, dated April 17, 1900.

Application filed February 7, 1900. Serial No. 4,302. (No model.)

*To all whom it may concern:*

Be it known that I, CHARLES W. MERRILL, a citizen of the United States, residing at Alameda, county of Alameda, State of California, have invented an Improvement in the Charging of Leaching-Vats with Ore or Tailings; and I hereby declare the following to be a full, clear, and exact description of the same.

My invention relates to a method of charging ore or tailings to a leaching-vat, which process is a step in the treatment of said ore or tailings preliminary to the application of the solvent solution in cyanid, hyposulfite, or other hydrometallurgical processes.

It consists, essentially, in conveying the tailings or ore by any well-known adaptable mechanical means to a point above the center of the vat to be charged and delivering the material there to a hopper which feeds a revolving chute inclined at an angle greater than the natural slope of the material to be handled and with openings adjustable both as to size and position, through which the material to be treated falls gently into the vat and distributes evenly, thus giving a charge of minimum density and maximum homogeneity, the conditions most favorable to successful leaching and dissolution of the precious metals.

The ordinary method of charging leaching-vats is from cars running on a superimposed track. By this means the momentum of the car-load of tailings or ore dropping through five or more feet to the bottom of the vat is such as to produce considerable packing, and, moreover, an uneven packing or density. For instance, in dumping from an end-discharge car the resultant mass of ore or tailings will take the form of a cone in the vat and the maximum density will be in the center of the approximate circle forming the base of the cone and will decrease along the radii toward the circumference of this circle. Furthermore, the variation in fineness of the different car-loads is not equalized, and a vat charge of ore or tailings results which is heterogeneous both as regards density and as regards fine and coarse material. Now, first, the charge of ore or tailings in a vat should be of the least density possible to obtain, because experience has demonstrated that the greater the permeability, and consequently the greater the amount of lixiviant possible to percolate through the charge, the greater the extraction of the precious metals in a given time, or, from another standpoint, the greater the permeability the less the economic period for leaching, and hence the less the cost for plant and subsequent operation; second, the charge should be as nearly homogeneous as possible as regards both density and size of material, because in leaching ores it is necessary to follow solution with wash-water to replace and prevent the loss of the former or to follow one lixiviant with another of different strength or containing a different solvent, and in doing this to maintain the surface of demarcation between the one and the other as nearly a horizontal plane as possible in order to minimize the mixing of effluent solutions. The above conditions of minimum density and maximum homogeneity are produced by means of a revolving inclined wide chute with small openings in the bottom, adjustable as to size and position transverse to the direction of the stream of ore or tailings. By means of this method a number of very small streams of ore or tailings fall gently into the vat as the chute revolves, and by increasing the speed of revolution a car-load of fine or coarse material can be spread over the whole area of the vat, thus giving the smallest possible dimension parallel with the course of the lixiviant. It is obvious that this method will therefore approach the ideal conditions more nearly than the method commonly used and described above.

The invention will be more fully explained by reference to the accompanying drawings, which represent one form of apparatus used with success to accomplish the method on the lines laid out.

Figure 1 is a vertical section through the chute and connections. Fig. 2 is a transverse section through the chute.

As here shown, the material is delivered into a hopper A, suitably located above the leaching-vat 2. The material may be brought to the hopper in any suitable manner. As here shown, it is delivered upon an endless traveling belt carrier 3, which continuously discharges into the hopper A. Beneath this hopper, which is centrally located above the vat, is a chute or trough 4, having an angle of inclination greater than the natural slope at which the material to be handled will lie. This chute extends diagonally down to a point near the periphery of the vat, and its lower end may be supported by a traveler or carriage 5, having wheels or rollers 6, which are fitted to run either upon the supporting edge concentric with the rim of the vat, or they may travel upon the rim of the vat itself. The upper end of the chute 4 is supported upon a suitable framework 7, and this is provided with circular, ball, or equivalent antifrictional bearings around the periphery, as shown at 8, so that the whole device travels easily and freely. Power may be transmitted to rotate the hopper and cause the chute 4 to move around over the pan by any suitable means. I have illustrated one convenient means for effecting this, which consists of a worm-gear 9, engaging the edge of the annular rim or support of the chute, and the shaft of the worm 9 carries a pulley or sprocket at 10, and a chain 11, passing around this and another sprocket at 12, provides for the movement of this part of the apparatus. In the bottom of the chute are a series of openings or passages 13, and these are controlled by transversely-slidable gates 14. These openings and gates are disposed at any suitable or desired intervals between the upper and lower end of the chute, and by moving these gates transversely the amount of opening between them may be varied. This opening may also be shifted to one side or the other of the chute, so that each alternate opening may be closer to one side and those intermediate be closer to the other side. By this arrangement the material flowing nearest to one side of the chute will be delivered through one series of openings and that flowing nearer the other side of the chute will be delivered through the other series of openings and intermediate between those first named. The openings may also be varied in size in the direction of the length of the chute by sliding the gates up or down with relation to the discharge-openings below or by the use of a series of independent longitudinal slidable gates.

In order to prevent the material from packing along the sides of the chute and to insure a free flow, I have shown curved plates 15 fitted into the angles at each side of the chute, forming concavities along these edges, which will prevent the material from lodging, as it would if the corners were exposed. By this or equivalent mechanism I am enabled to distribute the material as previously described and to the very best advantage.

Having thus described my invention, what I claim as new, and desire to secure by Letters Patent, is—

1. A mechanism for charging ore tailings or other material to a vat, tank, or like inclosure, consisting of a chute inclining from a point approximately above the center of the receptacle toward its periphery, said chute being revoluble with relation to the tank, and having a series of openings formed in its bottom and controlling-gates therefor.

2. A mechanism for charging ore, tailings or other material to a vat, tank, or like inclosure consisting of an inclined chute located above the inclosure, having a series of openings in the bottom, with controlling-gates and means whereby said chute is rotated around an axis common to itself and the tank.

3. An apparatus for charging ore, tailings and like material to vats or like inclosures, consisting of an inclined chute extending from a point above the center of the vat to its periphery and having valve-controlled openings, antifrictional bearings upon which the chute is supported, mechanism by which it is rotated around a common axis and means for supplying the material to the upper end of the chute.

4. An apparatus for charging vats or tanks with ore, tailings, or like material, consisting of an inclined chute having valve-controlled openings made through the bottom, said chute being located above the inclosure and having mechanism by which it is revolved around the common center, a receiving-hopper located above the upper end of the chute, and having discharge-openings thereto and means for delivering the material into said hopper.

5. An apparatus for charging ore, tailings and the like into vats or tanks consisting of an inclined hopper located and revoluble above the tank and having valve-controlled openings made through its bottom, a hopper located above the upper end of the chute and adapted to deliver material thereto, an endless traveling belt upon which the material is delivered and by which it is transferred to the hopper.

6. An apparatus for charging ore tailings and other material to a vat, tank, or inclosure, consisting of an inclined revoluble chute located and turnable above the inclosure with means for supplying material to the upper end of the chute, openings made through the bottom of the chute, and gates or valves slidable to and from the central line of said openings whereby the size and position of the openings may be varied.

7. In an apparatus for charging ore, tailings and the like to vats, tanks or like inclosures, an inclined chute located above the inclosure, and by means of which it is revolved around a vertical central axis, means by which material to be distributed is delivered to the upper end of the chute, openings made through the bottom of the chute at intervals in its length and gates or valves slidable transversely whereby the openings may be transverse to one side or the other of the chute and the size of the openings regulated.

8. In an apparatus for charging ore, tailings or other material to a vat, tank or like inclosure, an inclined chute located above the inclosure and mechanism by which it is revolved about a vertical center, said chute having the bottom and vertical sides connected by concaved curved plates, openings made in the bottom of said chute at intervals between the upper and lower end transversely and longitudinally movable gates or valves whereby the positions of the openings may be varied longitudinally or from side to side and the area of discharge regulated.

In witness whereof I have hereunto set my hand.

CHARLES W. MERRILL.

Witnesses:
S. H. NOURSE,
JESSIE C. BRODIE.